United States Patent [19]

Gale et al.

[11] 4,222,599
[45] Sep. 16, 1980

[54] DUTCH OVEN LIFTING DEVICE

[76] Inventors: Myron C. Gale, 592 S. 700 East; Michael S. Gale, 518 E. St. George Blvd., both of St. George, Utah 84770

[21] Appl. No.: 964,472

[22] Filed: Nov. 29, 1978

[51] Int. Cl.² .......................................... A47J 49/00
[52] U.S. Cl. .................................................... 294/12
[58] Field of Search .................. 294/9, 10, 11, 12, 13, 294/14, 6; D7/132

[56] References Cited

U.S. PATENT DOCUMENTS

| 163,659 | 5/1875 | Hoyt | 294/12 |
|---|---|---|---|
| 897,721 | 9/1908 | Davis | 294/10 |

Primary Examiner—James B. Marbert
Attorney, Agent, or Firm—Seiler & Quirk

[57] ABSTRACT

A hand-held device for selectively lifting a dutch oven or the oven lid comprises an elongated handle having a prong member secured at one end, the prong member having a first leg extending at an obtuse angle from the handle and a second leg extending at an acute angle therefrom, and a heel member secured on the second leg. The device is used for lifting an oven lid by directing the first leg beneath the lid handle with the heel resting on and stabilizing the lid. The oven is lifted by catching the bail on with the slanted second leg and lifting up.

11 Claims, 5 Drawing Figures

DUTCH OVEN LIFTING DEVICE

BACKGROUND OF THE INVENTION

Dutch ovens have been in use for many years, being especially suitafor for outdoor cooking and for preparing meals at campsites. Because of the recent popularity of recreational vehicles and campers, dutch ovens are again in significant popularity. Normally these ovens are quite heavy, often made of cast iron or the like, although different sized ovens are available. These vessels include a lid on which coals may be placed to assist in heating the oven, while the oven kettle or container itself rests on a bed of coals, over a fire, heated stones, etc. Because of the weight of these dutch ovens themselves, and certainly when containing ingredients, they are relatively difficult to lift. Such a problem further increases the difficulty of removing the ovn from the fire, although a bal is usually secured to the oven container. However, for one having to stoop over the fire and lift the hot oven, it is a difficult job. In addition, to inspect the cooking ingredients, or remove them for serving, the lid must be lifted. With hot coals or ashes on the lid, removal by hand is not only difficult, but some tool or stick is normally used to prevent the person from becoming burned. Even though great care is taken in removing the lid at this time, because the lid is often tilted on the tool or stick as it is lifted, the food becomes contaminated as ashes from the coals are accidentally dropped into the oven.

SUMMARY OF THE INVENTION

It is to the elimination of the problems heretofore mentioned on removal of a dutch oven lid or lifting the oven itself from a hot bed of coals or fire, that the device of the present invention is directed. The device comprises an elongated handle member having at its lower end a prong member which extends angularly with respect to the elongated axis of the handle. The first portion or leg of the prong member extends at an obtuse angle from the handle axis, and is used for being inserted into the lid handle for lifting the lid. The prong member includes a second portion or leg which extends at an acute angle from the handle axis, thereby forming a crotch, into which the oven bail is received for lifting the oven. A heel member, preferably a plate having a concave bottom surface, is located at the end of the second prong member portion for being urged against the oven cover as the first prong member portion is held through the oven cover handle, thereby stabilizing the cover to prevent it from accidentally tipping as it is being lifted or removed from the oven container. These as well as other advantages and uses of the device of the invention will be evident from the following detailed description.

DETAILED DESCRIPTION OF THE INVENTION

Figure 1:
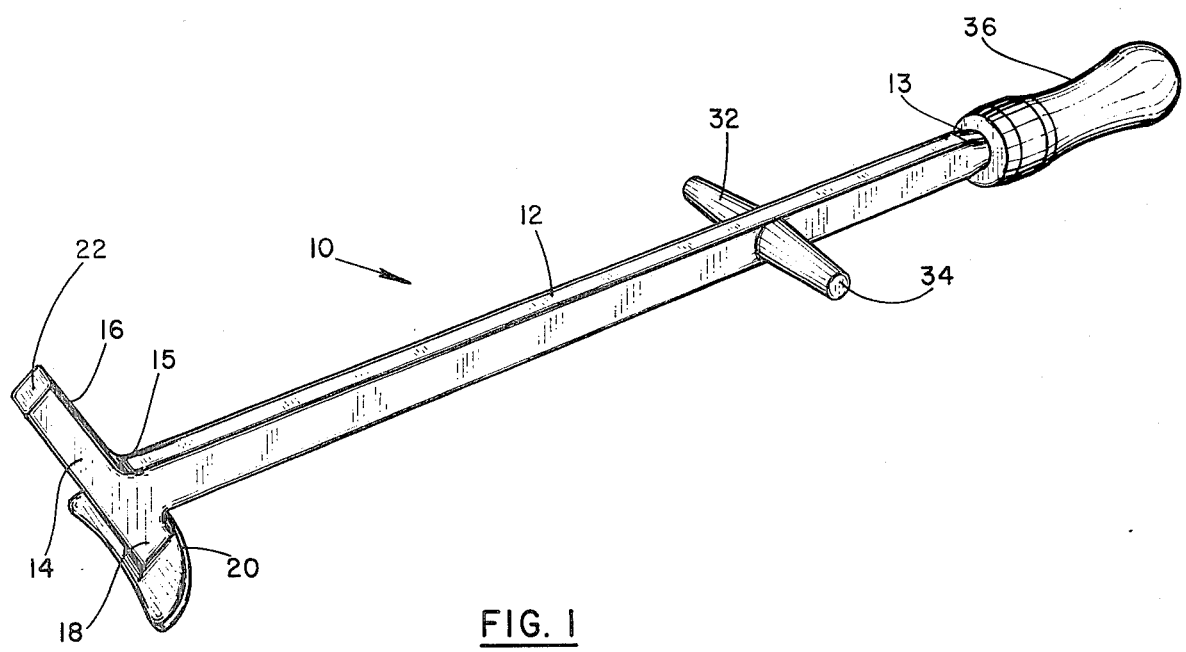
FIG. 1 is a perspective view illustrating the dutch oven lifting device of the invention.

In FIG. 1 there is shown the lifting device 10 of the invention which comprises an elongated handle 12, in the form of a rod or the like. The cross-sectional or outside shape of the handle is not important or critical, and it may be smooth, rectangular, square, circular or the like. At or near the upper end 13 of the handle is a handle end member 36. This member is optional, and is provided mainly for comfort, so that one can more easily and comfortably grasp the upper handle end with one hand when using the device. The handle end member may conveniently threadedly engage the upper handle end. The shape of the handle end member is not critical and any convenient shape to suit the function of the device may be used. Extending outwardly along the handle are a pair of auxilary handle members 32 and 34, again for the purpose of assisting the user in utilizing the device of the invention. These side handle members are of special assistance for stabilizing the device when the opeator grasps hand end member 36 with one hand and one or both of the side handle members 32 and/or 34 with the other hand in utilizing the device in a manner as will be illustrated further hereinafter.

Figure 2:
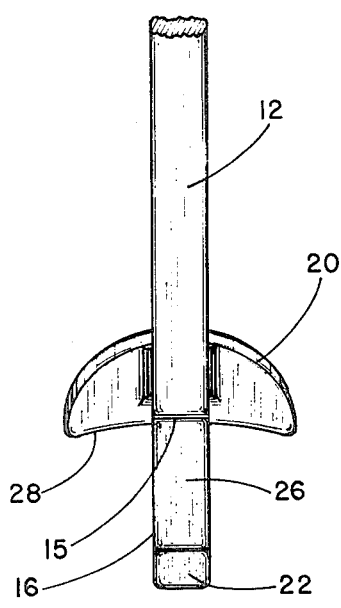
FIG. 2 is a partial front view of the lower end thereof illustrating the prong member.
Figure 3:
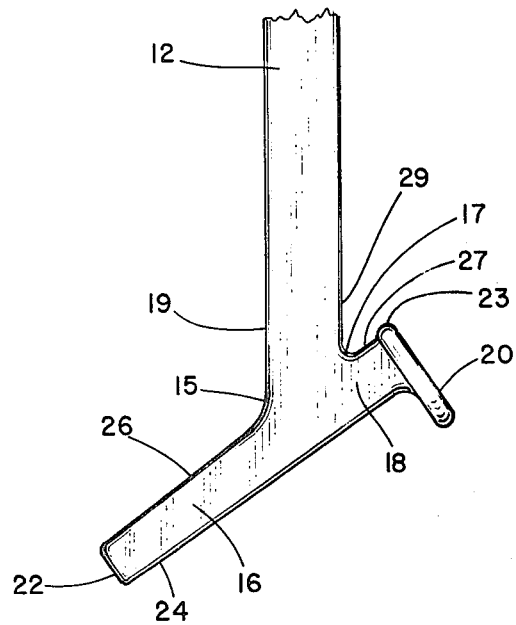
FIG. 3 is a side view of the prong member shown in FIG. 2.
Figure 4:
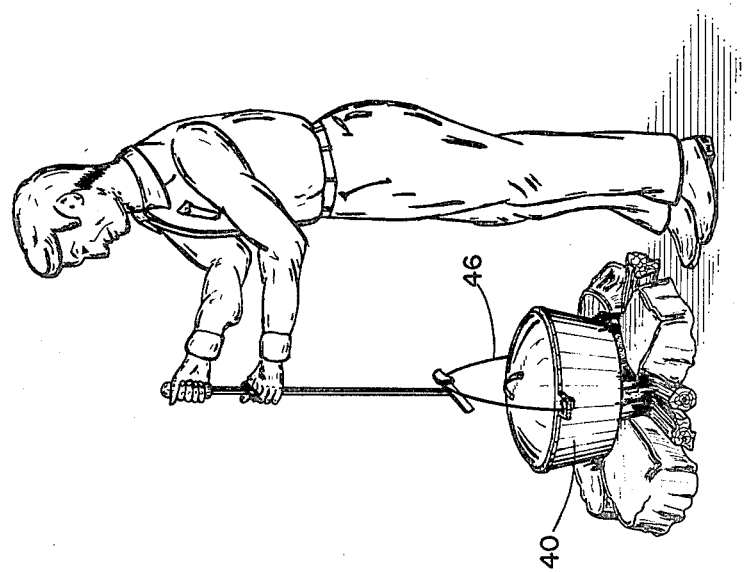
FIG. 4 illustrates the use of the device in lifting the lid of a dutch oven.

At the opposite end 15 of handle 12 is secured prong member 14. The prong member is preferably elongated, and extends along an axis which is angular to the axis extending along elongated handle member 12. This angular feature is especially observed in FIGS. 1 and 3. Prong member 14 includes a first leg portion 16 which terminates in forward end 22, and a second leg portion 18. Since one of the purposes of the device is for lifting a dutch oven lid without accidentally tipping the lid which could cause coals, ashes or soot to be dropped into the ingredients being cooked in the oven, the prong member has certain important features for this purpose. The top surface 26 of first prong member leg portion 16 is substantially flat, rather than rounded, or otherwise irregularly shaped, so that when the leg portion is inserted within the opening between the dutch oven cover handle, the upper surface 26 will be forced against the handle when the lid is lifted. This use is illustrated in FIG. 4. With the upper first leg portion being flat as shown in FIG. 2 and 3, the surface is also disposed so tht it is not tilted with respect to horizontal between the side surface edges when the elongated handle is held vertical. Since this feature is intended to prevent accidental tilting of the lid when it is being lifted, this flat surface feature shown is also important at the neck 15 where the upper leg portion surface meets the forward handle surface, and the forward lower handle surface 19 which may contact the lid handle during this operation. Similarly, it is preferred that lower surface 24 of first leg portion 16 is substantially flat. Both of these surfaces are also preferably flat or planar along a sight line taken normal to an axis extending along the length of those surfaces or along the prong length, i.e. horizontal. The lower leg surface 24 will be urged against the dutch oven lid when the device is used as shown in FIG. 4. Accordingly, it is understood that the flat feature of both the upper and the lower first leg portion prong surfaces will assist in preventing accidental tipping of the lid during this operation.

Opposite the first leg portion 16 of the prong member is a second leg portion 18. In the preferred embodiment, this second leg portion is simply an extension of the first leg portion so that the prong member is elongated, and is attached at its upper surface to the lower end of elongated handle member 12. Moreover, the first and second leg portions of the prong preferably have a flat bottom surface which extends along and is common to both of these leg portions as is shown particularly in FIG. 3.

At the end of the second leg portion 18 is secured a heel member 20. The heel member is of any shape, that shown having a circular peripheral surface. However, the bottom surface 28 of heel member 20 is preferably concave, as shown in FIG. 2, so that it may have greatest contact along that surface with the upper surface of the oven lid. Accordingly, the heel is used for assisting in lifting the dutch oven lid or cover as is shown in FIG. 4, and further stabilizing it for preventing accidental tipping as previously explained. With the first leg portion of the prong member being inserted through the opening between the lid handle, the bottom surface 28 of heel member 20 is urged against the upper lid surface. In this member, the lid is stabilized as the upper surface is forced against lower prong member surface 24 and lower heel member surface 28, while the lid handle 44 is forced against upper first leg portion 26 and against neck surface 15 and/or forward handle surface 19, depending on the size and shape of the dutch oven lid handle. Although the lower heel member surface 28 is concave as indicated to optimize its effectiveness for the intended purpose, it may be also flat, or otherwise shaped. If the dutch oven lid is more or less flat, a more flat heel surface 28 will also be effective. Otherwise, the size and shape of heel member 20 is not particularly critical, but the plate-like shape shown is convenient. Preferably, the upper peripheral edge 23 of plate 20 will extend at least slightly above upper surface 27 of second leg portion 18 to create a ridge for further assuring that a bail will not slide from the upper leg portion surface as will be more particularly explained hereinafter.

Figure 5:
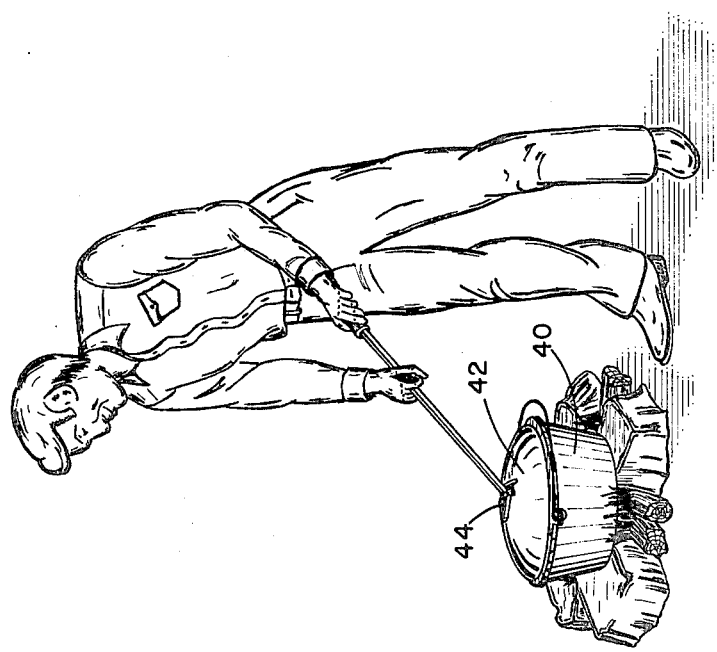
FIG. 5 illustrates the use of the device for lifting the dutch oven.

The other use of the device of the invention is to lift the entire dutch oven from a fire, bed of coals, or hearth, in a manner as illustrated in FIG. 5. This is accomplished by picking up bail 46 of dutch oven 40 so that it is directed into crotch 17 and is held there as the device is lifted vertically. Since bail 46 is rounded or arched between its ends at which it is attached to the dutch oven, the shape of upper surface 27 of second leg portion 18 is not so critical. However, again it is desirable that the upper peripheral edge 23 of heel member 20 extend above upper surface 27 to provide a ridge to prevent the bail from sliding out of the crotch 17 formed between the back side of the elongated handle 12 and upper surface 27. In order to form this crotch or restricted area 7 for holding the bail when lifting the dutch oven with the device, the second leg portion 18, and particularly upper surface 27 forms an acute angle with the back surface 29 of handle 12. This angle is preferably between about 20° and about 60°, or any other angle which will provide a restricted area for receiving and retaining the bail. Alternatively, a groove, notch, depression, or the like may be formed on the upper surface 27 of the device for so receiving the bail, again the purpose being simply to effectively receive and hold the bail as the dutch oven is being lifted. However, access or the opening to the bail receiving area should not be unduly restricted, since it is desirable to release the bail easily without the operator actually having to touch the bail, which is likely to be quite hot, when attempting to free the device after the dutch oven has been placed where desired. Similarly, the lower surface 28 of the heel may be formed in the bottom surface, preferably adjacent the rear end of the prong member. Also, the heel member may comprise legs, struts, or the like, extending outwardly from the second leg portion 18, to contact and stabilize the upper lid surface when removing it, as previously explained. It is also preferred that the first prong member be at least slightly tapered between the handle and end 22. Moreover, since the thickness or cross-sectional size of second prong member 18 is not critical, the entire side of the prong member may be tapered or wedge shaped. Other modifications or equivalent structures to achieve the same use of the device within the purview of the invention will be evident to those skilled in the art.

In utilizing the device of the invention, as shown in FIG. 4, a lid 42 of dutch oven 40 may be lifted by directing the first leg portion 16 of the prong member through the opening between the lid and lid handle 44. The operator simply continues to urge the prong member through the lid handle opening until the bottom or lower surface 28 of heel member 20 is urged against the upper lid surface, and the prong has been passed through the lid handle as far as desired. Thereafter, the operator simply continues to lift the device whereby the dutch oven lid will be lifted from the lower portion of the oven. Again, because of the features of the upper flat surface 26, lower flat surface 24 of the prong member, as well as the features of the heel member, the lid is easily stabilized, and prevented from being accidentally tipped, regardless of the uneven balance of the lid weight, caused by an uneven distribution of coals or ashes on the lid.

When utilizing the device to lift the entire dutch oven, as illustrated in FIG. 5, the device is directed until bail 46 is contacted on upper surface 27 of second leg portion 18 of the prong member, and the device is then lifted straight up, preferably so the lower handle portion is lifted substantially vertically. In that manner, the bail will be retained within crotch 17, and the oven is then lifted vertically until it can be moved to the side from the hearth, fire, or bed of coals. These as well as other advantages of the use of the device of the invention will be evident to those skilled in the art.

I claim:
1. A hand-held lifting device comprising
 an elongated rod member terminating at a first end,
 a prong member secured adjacent said first end of said rod member, comprising a first leg portion and a second leg portion each having a bottom surface, wherein said first leg portion extends along an axis forming an obtuse angle with an axis extending along said rod member, and said second leg portion extends along an axis forming an acute angle with said axis extending along said rod member,
 and a heel member secured on an end of said second leg portion and extending beyond said bottom surface thereof.
2. The device of claim 1 wherein said first and second leg portions have a common bottom surface which is substantially flat.
3. The device of claim 2 wherein said first leg portion has a top surface which is substantially flat.
4. The device of claims 1 or 3 wherein the acute angle is between about 20° and about 60°.
5. The device of claims 1 or 3 wherein the obtuse angle is between about 120° and about 160°.

6. The device of claim 1 wherein the heel member comprises a plate lying in a plane substantially normal to the axis of said second leg portion.

7. The device of claim 6 wherein said heel member has a concave bottom surface.

8. The device of claims 1, 3 or 6 wherein said first leg portion is tapered downwardly from said rod member.

9. The device of claim 1 wherein said heel member extends beyond a top surface of said second leg portion.

10. A method of lifting the lid of a dutch oven utilizing the device of claim 1 comprising inserting the first leg portion of the prong between a lid handle and said lid, urging said heel member against said lid, and lifting said lid by elevating said rod member.

11. A method of lifting a dutch oven having a bail secured thereon, with the device of claim 1 comprising:
securing said bail over the second leg portion of the prong and lifting the rod member in a substantially vertical direction.

* * * * *